United States Patent
Sharma et al.

(10) Patent No.: US 9,432,294 B1
(45) Date of Patent: Aug. 30, 2016

(54) UTILIZING USER-SPECIFIED ACCESS CONTROL LISTS IN CONJUNCTION WITH REDIRECTION AND LOAD-BALANCING ON A PORT

(71) Applicant: CISCO TECHNOLOGY, INC., San Jose, CA (US)

(72) Inventors: Samar Sharma, San Jose, CA (US); Mouli Vytla, San Jose, CA (US); Rajendra Kumar Thirumurthi, Cupertino, CA (US); Puneet Kumar, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/687,712

(22) Filed: Apr. 15, 2015

Related U.S. Application Data (60) Provisional application No. 62/136,489, filed on Mar. 21, 2015.

(51) Int. Cl.
*H04L 12/803* (2013.01)
*H04L 29/06* (2006.01)
*H04L 12/935* (2013.01)
*H04L 12/743* (2013.01)

(52) U.S. Cl.
CPC ......... *H04L 47/125* (2013.01); *H04L 45/7457* (2013.01); *H04L 49/3009* (2013.01); *H04L 69/22* (2013.01)

(58) Field of Classification Search
CPC ... H04L 47/125; H04L 63/101; H04L 45/00; H04L 47/70; H04L 41/00; H04L 43/028
See application file for complete search history.

(56) References Cited

U.S. PATENT DOCUMENTS

| | | | |
|---|---|---|---|
| 6,643,260 B1* | 11/2003 | Kloth | H04L 45/7453 370/235 |
| 6,996,615 B1* | 2/2006 | McGuire | G06F 9/505 709/224 |
| 7,808,897 B1 | 10/2010 | Mehta et al. | |
| 8,284,664 B1* | 10/2012 | Aybay | H04L 41/12 370/235 |
| 2004/0004941 A1* | 1/2004 | Malan | H04L 41/0627 370/254 |
| 2005/0125424 A1 | 6/2005 | Herriott | |
| 2011/0110382 A1 | 5/2011 | Jabr et al. | |
| 2011/0116443 A1 | 5/2011 | Yu et al. | |
| 2014/0006535 A1 | 1/2014 | Reddy | |
| 2014/0282611 A1 | 9/2014 | Campbell et al. | |
| 2015/0117458 A1 | 4/2015 | Gurkan et al. | |

OTHER PUBLICATIONS

U.S. Appl. No. 14/696,200, filed Apr. 24, 2015, entitled "Statistical Operations Associated With Network Traffic Forwarding," Inventor(s): Samar Sharma, et al.

(Continued)

*Primary Examiner* — Curtis A Alia
(74) *Attorney, Agent, or Firm* — Patent Capital Group (57) ABSTRACT

In one embodiment a packet of data is received at a network element. At least one field is parsed from the packet of data. A forwarding entry is identified from a plurality of forwarding entries based on the at least one field. The forwarding entry of the plurality of forwarding entries is formed by merging information from at least one load balancing entry and at least one access control list (ACL) entry. The data packet is forwarded through a port of the network element in accordance with the identified forwarding entry.

20 Claims, 4 Drawing Sheets

(56) References Cited

OTHER PUBLICATIONS

U.S. Appl. No. 14/693,925, filed Apr. 23, 2015, entitled "Selective Load Balancing of Network Traffic," Inventor(s): Samar Sharma, et al.

U.S. Appl. No. 14/696,209, filed Apr. 24, 2015, entitled "Line-Rate Selective Load Balancing of Permitted Network Traffic," Inventor(s): Samar Sharma, et al.

U.S. Appl. No. 14/696,226, filed Apr. 24, 2015, entitled "Load Balancing Methods for a Network Switch," Inventor(s): Samar Sharma, et al.

USPTO Aug. 26, 2015 Non-Final Office Action from U.S. Appl. No. 14/696,209.

USPTO Feb. 10, 2016 Final Office Action from U.S. Appl. No. 14/696,209.

\* cited by examiner

| 300 → | OPERATION | PORT IDENTIFIER | PROTOCOL | SOURCE IP RANGE | DESTINATION IP RANGE |
|---|---|---|---|---|---|
| 302a | PERMIT | | IP | 0.0.0.0/0 | 224.0.0.0/4 |
| 306a | REDIRECT | (0x60) | IP | 0.0.0.0/0.0.0.192 | 0.0.0.0/0 |
| 306b | REDIRECT | (0x61) | IP | 0.0.0.64/0.0.0.192 | 0.0.0.0/0 |
| 306c | REDIRECT | (0x5f) | IP | 0.0.0.128/0.0.0.192 | 0.0.0.0/0 |
| 306d | REDIRECT | (0x62) | IP | 0.0.0.192/0.0.0.192 | 0.0.0.0/0 |

| 304 → | OPERATION | PORT IDENTIFIER | PROTOCOL | SOURCE IP RANGE | DESTINATION IP RANGE |
|---|---|---|---|---|---|
| 302b | PERMIT | | IP | 100.100.0.0/16 | ANY |
| 302c | PERMIT | | IP | 200.200.0.0/16 | ANY |

| 308 → | OPERATION | PORT IDENTIFIER | PROTOCOL | SOURCE IP RANGE | DESTINATION IP RANGE |
|---|---|---|---|---|---|
| 310a | PERMIT | | IP | 200.200.0.0/16 | 224.0.0.0/4 |
| 310b | PERMIT | | IP | 100.100.0.0/16 | 224.0.0.0/4 |
| 310c | REDIRECT | (0x60) | IP | 200.200.0.0/255.255.0.192 | 0.0.0.0/0 |
| 310d | REDIRECT | (0x60) | IP | 100.100.0.0/255.255.0.192 | 0.0.0.0/0 |
| 310e | REDIRECT | (0x61) | IP | 200.200.0.64/255.255.0.192 | 0.0.0.0/0 |
| 310f | REDIRECT | (0x61) | IP | 100.100.0.64/255.255.0.192 | 0.0.0.0/0 |
| 310g | REDIRECT | (0x5f) | IP | 200.200.0.128/255.255.0.192 | 0.0.0.0/0 |
| 310h | REDIRECT | (0x5f) | IP | 100.100.0.128/255.255.0.192 | 0.0.0.0/0 |
| 310i | REDIRECT | (0x62) | IP | 200.200.0.192/255.255.0.192 | 0.0.0.0/0 |
| 310j | REDIRECT | (0x62) | IP | 100.100.0.192/255.255.0.192 | 0.0.0.0/0 |
| 310k | DENY | | IP | 0.0.0.0/0 | 0.0.0.0/0 |

UTILIZING USER-SPECIFIED ACCESS CONTROL LISTS IN CONJUNCTION WITH REDIRECTION AND LOAD-BALANCING ON A PORT

RELATED APPLICATION

This application claims benefit under 35 U.S.C. §119(e) of U.S. Provisional Application Ser. No. 62/136,489, entitled "UTILIZING USER-SPECIFIED ACCESS CONTROL LISTS IN CONJUNCTION WITH REDIRECTION AND LOAD-BALANCING ON A PORT," filed Mar. 21, 2015.

TECHNICAL FIELD

This disclosure relates in general to the field of communications and, more particularly, to utilizing user-specified access control lists in conjunction with redirection and load-balancing on a port.

BACKGROUND

A network element may include one or more ingress ports and one or more egress ports. The network element may receive network traffic through the ingress ports. As an example, network traffic may include one or more packets containing control information and data. The network element may perform various operations on the network traffic to select one or more of the egress ports for forwarding the network traffic. The network element then forwards the network traffic on to one or more devices coupled to the network element through the one or more egress ports.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment a packet of data is received at a network element. At least one field is parsed from the packet of data. A forwarding entry is identified from a plurality of forwarding entries based on the at least one field. The forwarding entry of the plurality of forwarding entries is formed by merging information from at least one load balancing entry and at least one access control list (ACL) entry. The data packet is forwarded through a port of the network element in accordance with the identified forwarding entry.

Example Embodiments

Figure 1:
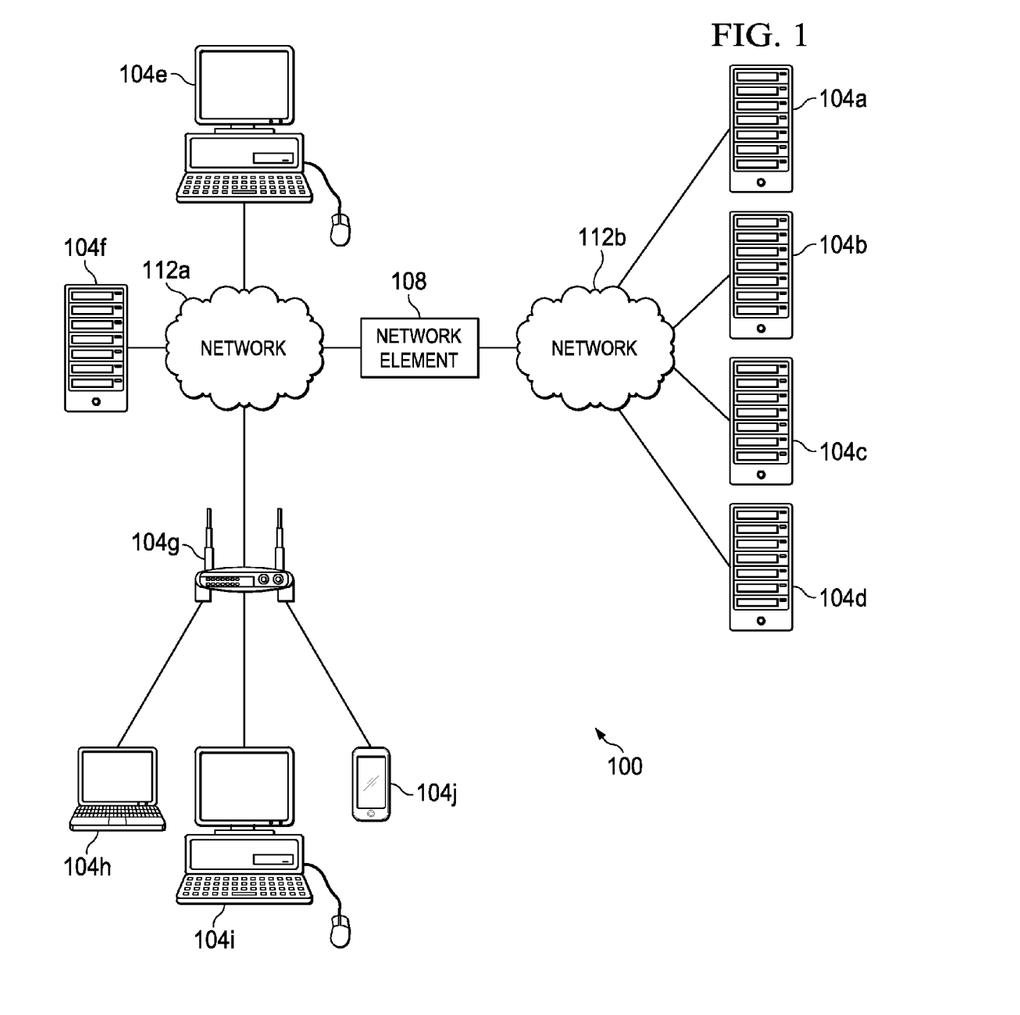
FIG. 1 illustrates a block diagram of a system for utilizing user-specified access control lists in conjunction with redirection and load-balancing on a port in accordance with certain embodiments.

FIG. 1 illustrates a block diagram of a system 100 for utilizing user-specified access control lists in conjunction with redirection and load-balancing on a port in accordance with certain embodiments. System 100 includes various network nodes 104 coupled to network element 108 via networks 112. In operation, network element 108 forwards network traffic (e.g., data packets) from one or more network nodes 104 or an internal component of network element 108 to one or more other network nodes 104 or an internal component of network element 108. Network element 108 may implement various traffic forwarding rules derived from commands received from a network administrator associated with network element 108. For example, commands received may include access control list (ACL) commands, load balancing commands, and/or redirection commands. As an example, a network administrator may instruct network element 108 to permit some traffic and deny other traffic through one or more ACLs. On the traffic that is permitted, the network administrator instruct the network element 108 to apply redirection and/or load-balancing. Thus, the network element 108 may provide customization of the traffic forwarding by a network administrator.

As the number of network nodes in a network increases, complexity in the network increases as well. As the network complexity increases, implementation of customized traffic forwarding rules may require additional hardware and/or software resources, power, and time to implement, particularly if the customization is implemented in a serial fashion (e.g., a packet may go through logic implementing a user-specified ACL, and then different logic implementing a load balancer, and then other logic implementing redirection).

Various embodiments of the present disclosure provide systems and methods for simultaneously performing access control operations, load-balancing, and/or redirection operations. Such embodiments provide efficient utilization of network element 108's resources and faster operation than systems that perform traffic forwarding customization operations in a serial fashion. In particular embodiments, a user-specific ACL command may be implemented in parallel with a redirection and/or load balancing command in the same clock cycle of network element 108.

Network element 108 may be any device or system operable to forward traffic in conjunction with customized rules. For example, network elements may include network switches, routers, servers (physical servers or servers virtually implemented on physical hardware), machines (physical machine or machines virtually implemented on physical hardware), end user devices, access points, cable boxes, gateways, bridges, loadbalancers, firewalls, inline service nodes, proxies, processors, modules; other suitable devices, components, elements, proprietary appliances, or objects operable to exchange, receive, and transmit information in a network environment; or a combination of two or more of these. A network element may include any suitable hardware, software, components, modules, interfaces, or objects that facilitate operations associated with utilizing user-specified access control lists in conjunction with redirection and load-balancing. This may be inclusive of appropriate algorithms and communication protocols that allow for the effective exchange of data or information. Network element 108 may be deployed in a data center, as an aggregation node (to aggregate traffic from a plurality of access domains), within a core network, or in other suitable configuration.

Similarly, a network node 104 may be any device or system operable to exchange, transmit, and or receive information in a network environment. For example, network nodes may include network switches, routers, servers (physical servers or servers virtually implemented on physical hardware) (e.g., servers 104*a*-*d* and 104*f*), machines (physical machine or machines virtually implemented on physical hardware), end user devices (such as laptop 104*h*, desktop computer 104*e* and 104*i*, smartphone 104*j*), access points (e.g., 104*g*), cable boxes, gateways, bridges, loadbalancers, firewalls, inline service nodes, proxies, processors, modules; or any other suitable devices, components, elements, proprietary appliances, objects operable to exchange, receive, and transmit information in a network environment; or a combination of two or more of these. A network node 104 may include any suitable hardware, software, components, modules, interfaces, or objects that facilitate its communications operations. This may be inclusive of appropriate algorithms and communication protocols that allow for the effective exchange of data or information.

A network node 104 or a network element 108 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein. The components of the one or more computer systems may comprise any suitable physical form, configuration, number, type, and/or layout. Where appropriate, one or more computer systems may be unitary or distributed, span multiple locations, span multiple machines, or reside in a cloud, which may include one or more cloud components in one or more networks.

A network 112 represents a series of points, nodes, or network elements of interconnected communication paths for receiving and transmitting packets of information that propagate through a communication system. A network offers a communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium. In some embodiments, a network may simply comprise a cable (e.g., an Ethernet cable), air, or other transmission medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

Figure 2:
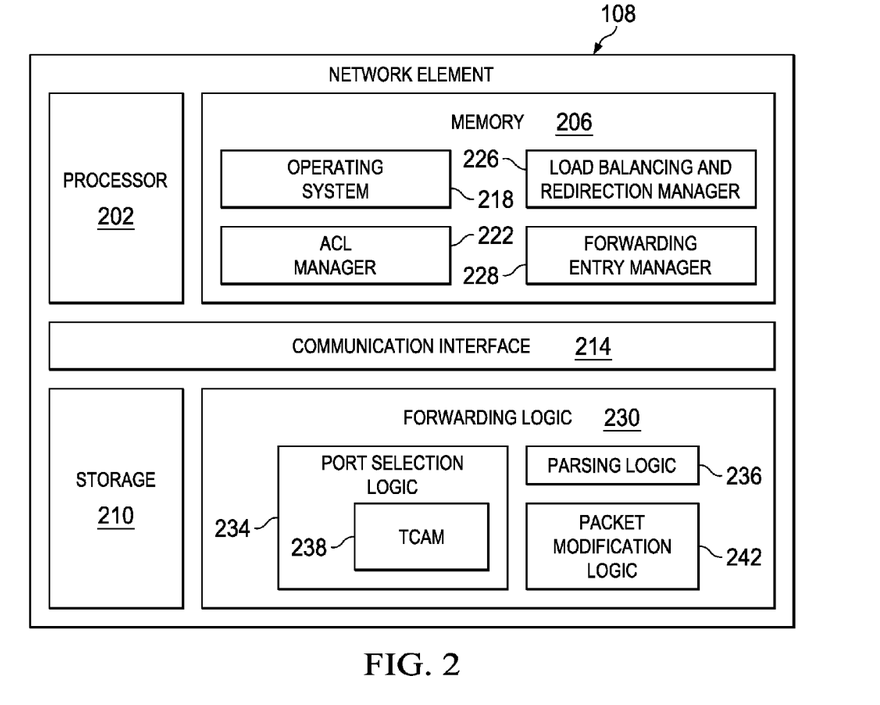
FIG. 2 illustrates a block diagram of a network element in accordance with certain embodiments.

FIG. 2 illustrates a block diagram of a network element 108 in accordance with certain embodiments. In the embodiment depicted, network element 108 includes a computer system to facilitate performance of its operations. In particular embodiments, a computer system may include a processor, memory, storage, one or more communication interfaces, and a display. As an example, network element 108 comprises a computer system that includes one or more processors 202, memory 206, storage 210, and one or more communication interfaces 214. These components may work together in order to provide functionality described herein. Network element may also comprise forwarding logic 230. Forwarding logic 230 may be operable to implement user-specified traffic forwarding rules to traffic received via communication interface 214 and send the results to communication interface 214 for forwarding out of the appropriate port of network element 108.

Communication interface 214 may be used for the communication of signaling and/or data between network element 108 and one or more networks (e.g., 112*a* or 112*b*) and/or network nodes 104 coupled to a network 112. For example, communication interface 214 may be used to send and receive data packets. Each communication interface 214 may send and receive data and/or signals according to a distinct standard such as Asynchronous Transfer Mode (ATM), Frame Relay, or Gigabit Ethernet (or other IEEE 802.3 standard). In a particular embodiment, communication interface 214 comprises one or more ports that may each function as an ingress and/or egress port. As one example, communication interface 214 may comprise a plurality of Ethernet ports.

Processor 202 may be a microprocessor, controller, or any other suitable computing device, resource, or combination of hardware, stored software and/or encoded logic operable to provide, either alone or in conjunction with other components of network element 108, network element functionality. In some embodiments, network element 108 may utilize multiple processors to perform the functions described herein.

The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Memory 206 and/or storage 210 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 206 and/or storage 210 may store any suitable data or information utilized by network element 108, including software embedded in a computer readable medium, and/or encoded logic incorporated in hardware or otherwise stored (e.g., firmware). Memory 206 and/or storage 210 may also store the results and/or intermediate results of the various calculations and determinations performed by processor 202.

In certain example implementations, the customized traffic forwarding functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification.

Any of the memory items discussed herein should be construed as being encompassed within the broad term 'memory element.' Similarly, any of the potential processing elements, modules, and machines described in this Specification should be construed as being encompassed within the broad term 'processor.'

In one implementation, a network element 108 described herein may include software to achieve (or to facilitate) the functions discussed herein for customized traffic forwarding where the software is executed on one or more processors 202 to carry out the functions. This could include the implementation of one or more instances of an operating system 218, ACL manager 222, load balancing and redirection manager 226, and/or any other suitable elements that would foster the activities discussed herein. In other embodiments, one or more of these elements may be implemented in hardware and/or firmware such as reprogrammable logic in an ASIC.

In some embodiments, the operating system 218 provides an application program interface (API) that allows a network administrator to provide information to the network element 108. For example, the API may allow the network administrator to specify traffic customization information such as one or more ACLs, load balancing commands, and/or redirection commands. In various embodiments, a network administrator may specify the traffic customization information through one or more interfaces, such as a command-line interface (CLI) (e.g., manually entered or entered via a script) or a graphical user interface (GUI) using any suitable programming language (e.g., Extensible Markup Language (xml) or Python).

The operating system 218 may be capable of communicating the traffic customization information received from the network administrator to other portions of network element 108 (e.g., to forwarding logic 230). In particular embodiments, the operating system 218 is operable to program logic of network element 108 based on traffic customization information received from the network administrator.

The ACL manager 222 maintains and tracks ACLs. An ACL filters network traffic by controlling whether received packets are forwarded or blocked at one or more ports of the network element 108. In particular embodiments, an ACL may apply to traffic received from a single port. In other embodiments, the same ACL may apply to multiple ports.

An ACL may include one or more ACL entries. An ACL entry specifies matching criteria and an indication of whether packets that meet the matching criteria should be permitted (i.e., forwarded) or denied (i.e., blocked). Any suitable matching criteria may be specified, such as one or more identifiers associated with the source and/or destination of the packet. For example, the matching criteria may include one or more source Internet Protocol (IP) addresses, one or more destination IP addresses, one or more source MAC addresses, and/or one or more destination MAC addresses. In some embodiments, the matching criteria may include one or more protocols associated with the packet. For example, an ACL entry may apply only to traffic associated with a single protocol (e.g., Hypertext Transfer Protocol [HTTP]) or may apply to traffic associated with multiple protocols (e.g., HTTP, Secure Sockets Layer [SSL], and File Transfer Protocol [FTP]). In some embodiments, an ACL may include separate ACL entries that are each associated with a different protocol.

The ACLs managed by ACL manager 222 may be generated by any suitable entity, such as the network administrator or various features of network element 208. When an ACL is generated or received by a component of network element 108, the ACL is passed to the ACL manager 222. The ACL manager is responsible for sending the ACL to the forwarding entry manager 228 to be merged with load balancing and/or redirection entries. In addition to receiving and managing user-specified ACLs, the ACL manager may receive ACLs from any suitable feature of network element 108, such as a load balancer, a module implementing Web Cache Communication Protocol, a core policy (e.g., a policy that limits traffic going to processor 202 or a supervisor module associated with network element 108), etc.

In the embodiment depicted, ACL manager 222 is implemented at least in part by instructions stored in memory 206 and executed by processor 202. In some embodiments, ACL manager 222 may be implemented at least in part by hardware and/or firmware of network element 108.

The load balancing and redirection manager 226 receives load balancing commands and redirection commands and communicates with forwarding logic 230 to implement these commands. In various embodiments, these commands may be converted into load balancing entries and/or redirection entries before being communicated to forwarding logic 230. In other embodiments, the load balancing commands and/or redirection commands are received in a format similar to the format for the load balancing entries and/or redirection entries described below, such that no conversion is needed.

A redirection entry may specify that traffic matching certain criteria should be redirected to a particular destination. A redirection entry specifies matching criteria and an indication of where to redirect packets that meet the matching criteria. Any suitable matching criteria may be specified, such as one or more identifiers associated with the source and/or destination of the packet. For example, the matching criteria may include one or more source IP addresses, one or more destination IP addresses, one or more source MAC addresses, and/or one or more destination MAC addresses. In some embodiments, the matching criteria may include one or more protocols associated with the packet. For example, a redirection entry may apply only to traffic associated with a single protocol (e.g., TCP or IP) or may apply to traffic associated with multiple protocols (e.g., TCP and IP).

A load balancing command may specify a load balancing scheme. For example, with respect to the embodiment depicted in FIG. 1, a load balancing scheme may specify how traffic forwarded by network element 108 is to be distributed among servers 104a-d. Network element 108 may load balance among any number of suitable network nodes 104, such as firewalls, application servers, other load balancers (e.g., load balancers that perform load balancing in software), inspection devices, etc.

In some embodiments, a load balancing command may be expressed at a higher level of abstraction than one or more corresponding load balancing entries that are created based on the load balancing command. For example, a load balancing command may specify that random network traffic is to be split evenly among the four servers 104a-d while the load balancing entries may specify matching criteria and redirection information to implement the load balancing scheme specified by the load balancing command. In some embodiments, the load balancing entries may have any suitable characteristics of the redirection entries described herein. However a load balancing entry facilitates implementation of a load balancing scheme.

In particular embodiments, a load balancing entry may apply to traffic received from a single port. In other embodiments, the same load balancing entry may apply to multiple ports. Similarly, a redirection entry may apply to one ingress port or multiple ingress ports.

The load balancing and redirection commands managed by load balancing and redirection manager 226 may be generated by any suitable entity, such as the network administrator or various features of network element 208. When a load balancing or redirection command is generated or received by a component of network element 108, the load balancing or redirection command is passed to the load balancing and redirection manager 226. The load balancing and redirection manager 226 is responsible for sending the load balancing and redirection commands (or corresponding entries) to the forwarding entry manager 228 to be merged with one or more ACL entries. In various embodiments, load balancing and redirection manager 226 may update the load balancing entries in response to a change in network topology (e.g., in an additional network node 104 becomes available or one of the network nodes 104a-d goes down).

In the embodiment depicted, load balancing and redirection manager 226 is implemented at least in part by instructions stored in memory 206 and executed by processor 202. In some embodiments, load balancing and redirection manager 226 may be implemented at least in part by hardware and/or firmware of network element 108.

In particular embodiments, forwarding entry manager 228 is operable to merge one or more ACL entries with one or more load balancing entries and/or redirection entries to create a set of one or more forwarding entries. A forwarding entry may have any suitable characteristics of an ACL entry, a load balancing entry, or a redirection entry as described herein. Merging multiple entries to create one or more forwarding entries may involve any suitable operations, such as a logical AND operation based on a portion of at least two of the entries. The result of the merging operations is a set of forwarding entries that implements each ACL, load balancing, and redirection entry received as input to the forwarding entry manager 228. One forwarding entry may simultaneously implement operations associated with an ACL entry and a load balancing entry (or redirection entry) when applied to incoming network traffic.

In particular embodiments, forwarding entry manager 228 creates one or more additional forwarding entries after generating the forwarding entries from the ACL entries and the load balancing entries and/or redirection entries. For example, if the existing forwarding entries do not cover each possible scenario, a default forwarding entry (that may be applied if no other match is found) may be generated that denies all traffic (e.g., if the forwarding entries include one or more entries permitting certain traffic) or permits all traffic (e.g., if the forwarding entries include one or more entries denying certain traffic). In various embodiments, the traffic forwarding entries may have a priority assigned, such that a traffic forwarding entry with a higher priority is checked for a match with a packet to be forwarded before the traffic forwarding entry with the lower priority is checked for a match with the packet. In some embodiments, the default forwarding entry has the lowest priority of the traffic forwarding entries. In various embodiments, the priorities of the traffic forwarding entries are based on user-specified rules associated with the ACL entries and load balancing and/or redirection entries merged to form the traffic forwarding entries.

The forwarding entry manager 228 is responsible for sending the forwarding entries to the forwarding logic 230 to be implemented. As one example, the forwarding entry manager 228 may instruct that the forwarding entries be programmed into a memory (e.g., TCAM 238) of the port selection logic 234 (e.g., by calling a hardware driver associated with the TCAM).

In the embodiment depicted, forwarding entry manager 228 is implemented at least in part by instructions stored in memory 206 and executed by processor 202. In some embodiments, forwarding entry manager 228 may be implemented at least in part by hardware and/or firmware of network element 108.

Forwarding logic 230 is operable to apply the forwarding entries to the appropriate network traffic. In the embodiment depicted, forwarding logic 230 includes port selection logic 234, parsing logic 236, and packet modification logic 242. In various embodiments, any suitable portion of forwarding logic 230 may comprise fixed logic or programmable logic (e.g., software/computer instructions executed by the processor), such as a programmable processor, programmable digital logic (e.g., an FPGA, an EPROM, an EEPROM) or an ASIC that includes digital logic, software, code, electronic instructions, or any suitable combination thereof. In a particular embodiment, forwarding logic 230 comprises an ASIC that is operable to perform customized traffic forwarding in hardware by utilizing logic (e.g., one or more memories such as TCAM 238) that is reprogrammable by an entity (e.g., the operating system 218) based on traffic customization information (e.g., received from a network administrator).

Parsing logic 236 may be operable to receive packets from the ingress ports of network element 108. The parsing logic 236 may be configured to parse any necessary information from a received packet. Parsing logic 236 may be configured to parse any suitable information, such as one or more protocols associated with the packet, a source IP address of the packet, a source MAC address of the packet, a destination IP address of the packet, a destination MAC address of the packet, or other suitable information from the packet. In some embodiments, the parsing logic 236 is configured to parse information based on the information used in the forwarding entries. In some embodiments, the parsing logic 236 is configured on a port-by-port basis, such that packets from each port may be parsed based on the forwarding entries associated with that port. The parsed information is passed to port selection logic 230.

Port selection logic 230 is operable to receive forwarding entries from forwarding entry manager 228 and configure itself to implement the forwarding entries. For example, port selection logic 230 may store the forwarding entries associated with a particular port in a content addressable memory, such as a TCAM 238. When a packet is received on that port, information parsed from the packet by parsing logic 236 (and any other suitable information associated with the packet) may be passed to the port selection logic 234. The port selection logic 234 uses this information to perform a lookup in the TCAM. Port selection logic 234 will then forward the traffic through the appropriate port in accordance with the forwarding entry that matches the information parsed from the packet. If the packet is to be redirected, packet modification logic may modify the appropriate fields of the packet (e.g., destination IP address and/or destination MAC address) before the packet is forwarded out of the appropriate egress port of network element 108.

Figure 3:
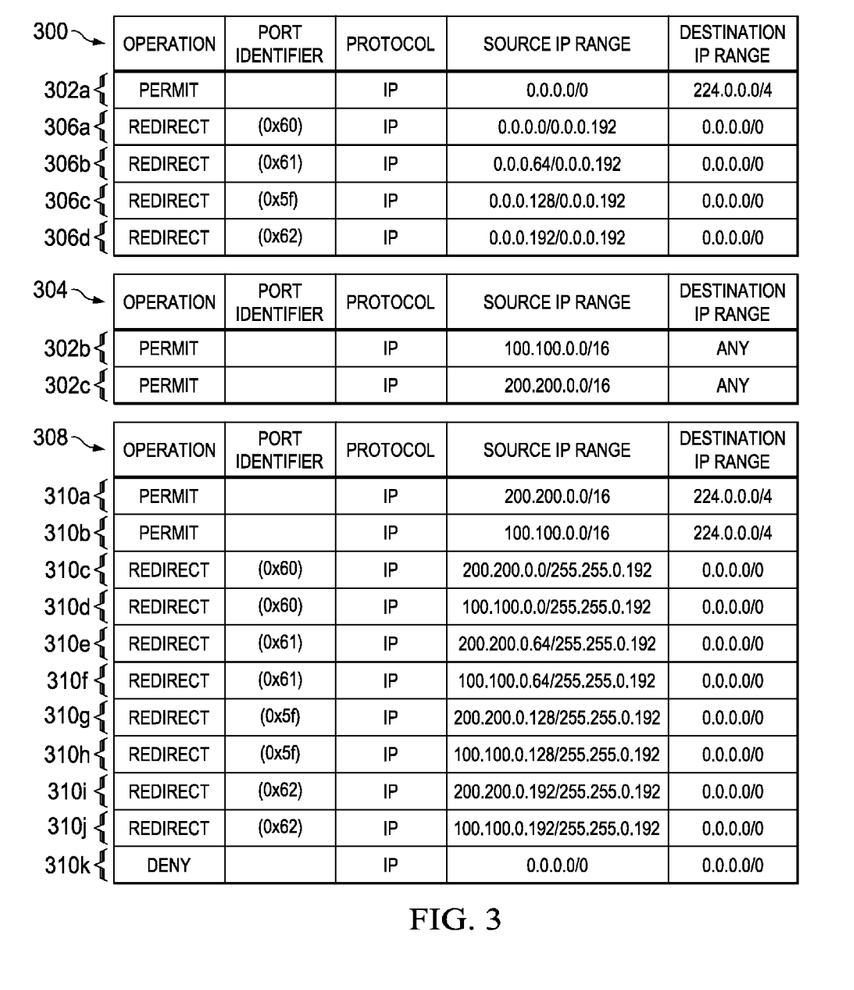
FIG. 3 illustrates an example merging of ACL entries and load balancing entries to create traffic forwarding entries in accordance with certain embodiments.

FIG. 3 illustrates an example merging of ACL entries 302 and load balancing entries 306 to create traffic forwarding entries 310 in accordance with certain embodiments. In the embodiment depicted, block 300 represents example load balancing entries 306 and an example ACL entry, block 304 represents example ACL entries 302, and block 308 represents example traffic forwarding entries 310. In various embodiments, such entries could be utilized by forwarding logic 230 (e.g., stored in TCAM 238).

Block 300 represent entries that may be produced, e.g., by load balancing and redirection manager 226 (as described earlier, in some embodiments a load balancing feature may generate one or more ACL entries as well as load balancing entries). The example load balancing entries 306 could be used to distribute network traffic among four different servers, where each server is coupled to a port of the network element 108 identified by one of the port identifiers (e.g., 0x60, 0x61, 0x5f, and 0x62). Entry 306a specifies that traffic matching the IP protocol and having a source IP address that matches the specified source IP range will be redirected to the port corresponding to the identifier 0x60. In the example depicted, the IP address ranges are specified in IP address/wildcard mask format (where the wildcard mask is applied to the IP address of the traffic and compared against the IP address specified in the IP range), though in other embodiments the ranges may be specified in any suitable manner. Each of the load balancing entries 306 will result in the redirection of traffic to a different port based on the value of the last octet of the source IP address.

The example ACL entries 302 each permit IP traffic based on a source IP address regardless of the destination IP address. In the embodiment depicted, the IP address ranges are depicted in Classless Inter-Domain Routing (CIDR) notation, though any suitable notation may be used. Entry 302a permits IP traffic with a destination IP address matching the IP subnet 224.0.0.0/4, entry 302b permits traffic with a source IP address matching the IP subnet 100.100.0.0/16, and entry 302c permits traffic with a source IP address matching the IP subnet 200.200.0.0/16.

The forwarding entries 310 illustrate the results of merging the entries of block 300 and the entries of block 304 to form a set of forwarding entries 310. Entry 310a specifies that IP traffic having a source IP address matching the IP subnet 200.200.0.0/16 and a destination IP address matching the IP subnet 224.0.0.0/4 is permitted (and will be routed normally via a routing table or other means without having redirection applied to it). Entry 310a is the result of merging entry 302a with 302c. Similarly, entry 310b is the result of merging entry 302a with 302b. Merging ACL entries 302b and 302c with the various load balancing entries 306 result in the traffic forwarding entries 310c-j. Finally, a default forwarding entry 310k has been added to deny all traffic that does not match one of the other traffic forwarding entries.

Figure 4:
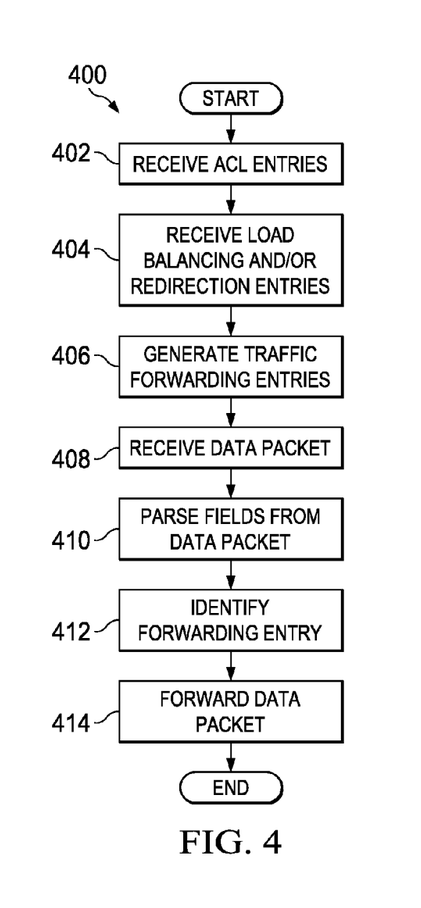
FIG. 4 illustrates an example method for forwarding traffic based on traffic forwarding entries in accordance with certain embodiments.

FIG. 4 illustrates an example method 400 for forwarding traffic based on traffic forwarding entries in accordance with certain embodiments. The method begins at step 402, where ACL entries are received (e.g., from a network administrator). At step 404, load balancing and/or redirection entries are received. At step 406, the ACL entries and load balancing and/or redirection entries are merged to form traffic forwarding entries.

At step 408, a data packet is received. At step 410, fields of the data packet are parsed. For example, one or more fields from a header of the data packet may be parsed. Various examples of such fields include the source and/or destination IP address, the source and/or destination MAC address, and one or more protocols associated with the data packet. At step 412, a forwarding entry is identified that matches the data packet. In some embodiments, a content addressable memory is searched using the fields that were parsed from the data packet. At step 414, the data packet is forwarded through a port of the network element 108 based, at least in part, on the forwarding entry.

Some of the steps illustrated in FIG. 4 may be repeated, combined, modified or deleted where appropriate, and additional steps may also be added to the flowchart. Additionally, steps may be performed in any suitable order without departing from the scope of particular embodiments.

Figure 5:
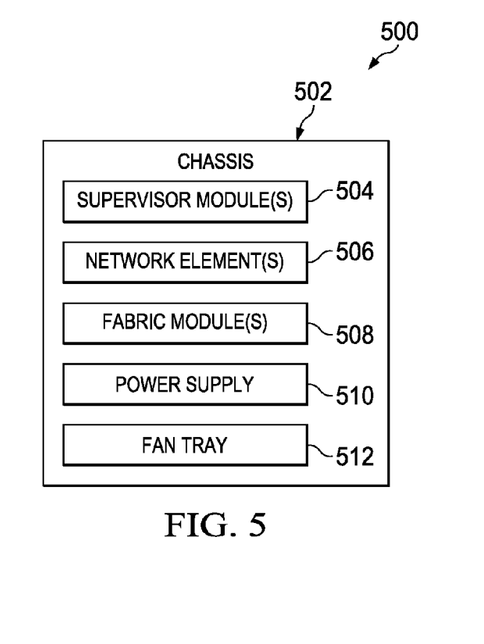
FIG. 5 illustrates a block diagram of one or more network elements embodied within a chassis in accordance with certain embodiments.

FIG. 5 illustrates a block diagram 500 of one or more network elements embodied within a chassis 502 in accordance with certain embodiments. Chassis 502 may include various slots configured to electrically and mechanically couple to various circuit boards (e.g., line cards), such as one or more supervisor module(s) 504, one or more network elements(s) 506, one or more fabric module(s) 508, one or more power supplies (510), one or more fan trays 512, or other components. In various embodiments, a network element 508 may correspond to network element 108. In other embodiments, the entire chassis 502 may correspond to network element 108.

A supervisor module 504 may include a computer system with at least one processor and may be operable to scale the control plane, management, and data plane services for the chassis and its components. A supervisor module 504 may control the Layer 2 and 3 services, redundancy capabilities, configuration management, status monitoring, power and environmental management of the chassis and its components. In some embodiments, supervisor module 504 provides centralized arbitration to the system fabric for all line cards.

Cisco NX-OS is designed to support distributed multi-threaded processing on symmetric multiprocessors (SMPs), multicore CPUs, and distributed line-card processors. Computationally intensive tasks, such as hardware table programming, can be offloaded to dedicated processors distributed across the line cards. Cisco NX-OS modular processes are instantiated on demand, each in a separate protected memory space. Thus, processes are started and system resources allocated only when a feature is enabled.

Network element 506 may include a distributed forwarding engine for L2/L3 forwarding. Network element 506 may include integrated hardware support for protecting the supervisor CPU from excessive traffic; for providing ACL counters and logging capability, for providing Layer 2 to Layer 4 ACL for both IPv4 and IPv6 traffic, and any other characteristics described herein with respect to network element 108.

Fabric module 508 is capable of coupling the various network elements 506 in the chassis together (e.g., through their respective ports). In connection with the supervisor module 504 and network elements 506, the fabric module 508 may provide virtual output queuing (VoQ) and creditbased arbitration to a crossbar switch to increase performance of the distributed forwarding system implemented by chassis 502.

Chassis 502 may also include one or more power supplies 510 for powering the various components of chassis 502 and one or more fan trays 512 for cooling the various components of chassis 502.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of utilizing user-specified access control lists in conjunction with redirection and load-balancing on a port, as potentially applied to a myriad of other architectures.

It is also important to note that the steps in the FIG. 4 illustrate only some of the possible scenarios that may be executed by, or within, the network elements described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by the network elements 108 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
storing, at a network element, a plurality of merged forwarding entries, a merged forwarding entry formed by merging information from at least one load balancing entry and at least one access control list (ACL) entry;
receiving, at the network element, a packet of data after the plurality of merged forwarding entries are stored;
parsing at least one field from the packet of data;
identifying a merged forwarding entry from the plurality of merged forwarding entries based on the at least one field; and
forwarding the packet of data through a port of the network element in accordance with the identified merged forwarding entry.

2. The method of claim 1, wherein the information from the at least one ACL entry specifies at least one address and an indication to permit traffic associated with the at least one address.

3. The method of claim 1, wherein the information from the at least one ACL entry specifies at least one address and an indication to deny traffic associated with the at least one address.

4. The method of claim 1, wherein the information from the at least one load balancing entry comprises an egress port of the network element and at least one address.

5. The method of claim 1, further comprising determining the plurality of merged forwarding entries based on a plurality of ACL entries and a plurality of load balancing entries.

6. The method of claim 1, wherein at least one of the plurality of merged forwarding entries is formed by merging the at least one ACL entry and at least one redirection entry.

7. The method of claim 1, wherein the merged forwarding entry is identified during a single clock cycle of the network element.

8. The method of claim 1, further comprising receiving the at least one ACL entry via a command line interface from a user of the network element.

9. The method of claim 1, wherein the plurality of merged forwarding entries are stored in a ternary content-addressable memory (TCAM).

10. An apparatus comprising:
at least one memory element to store a plurality of merged forwarding entries, a merged forwarding entry of the plurality of merged forwarding entries formed by merging at least one load balancing entry and at least one access control list (ACL) entry; and
forwarding logic to:
receive a packet of data after the plurality of forwarding entries are stored in the at least one memory element;
parse at least one field from the packet of data;
identify a merged forwarding entry from the plurality of merged forwarding entries based on the at least one field; and
forward the packet of data in accordance with the identified merged forwarding entry.

11. The apparatus of claim 10, wherein the information from the at least one ACL entry specifies at least one address and an indication to permit traffic associated with the at least one address.

12. The apparatus of claim 10, wherein the information from the at least one ACL entry specifies at least one address and an indication to deny traffic associated with the at least one address.

13. The apparatus of claim 10, wherein the information from the at least one load balancing entry comprises an egress port of the apparatus and at least one address.

14. The apparatus of claim 10, wherein the at least one memory element is further to store computer-readable non-transitory medium comprising one or more instructions that when executed by a processor configure the processor to determine the plurality of merged forwarding entries based on a plurality of ACL entries and a plurality of load balancing entries.

15. The apparatus of claim 10, wherein at least one of the plurality of merged forwarding entries is formed by merging the at least one ACL entry and at least one redirection entry.

16. A computer-readable non-transitory medium comprising one or more instructions that when executed by a processor configure the processor to cause programmable logic to perform operations comprising:
- storing, at a network element, a plurality of merged forwarding entries, a merged forwarding entry formed by merging information from at least one load balancing entry and at least one access control list (ACL) entry;
- receiving, at the network element, a packet of data after the plurality of merged forwarding entries are stored;
- parsing at least one field from the packet of data;
- identifying a merged forwarding entry from the plurality of merged forwarding entries based on the at least one field; and
- forwarding the packet of data through a port of the network element in accordance with the identified merged forwarding entry.

17. The medium of claim 16, wherein the information from the at least one ACL entry specifies at least one address and an indication to permit traffic associated with the at least one address.

18. The medium of claim 16, wherein the information from the at least one ACL entry specifies at least one address and an indication to deny traffic associated with the at least one address.

19. The medium of claim 16, wherein the information from the at least one load balancing entry comprises an egress port of the network element and at least one address.

20. The medium of claim 16, wherein at least one of the plurality of merged forwarding entries is formed by merging the at least one ACL entry and at least one redirection entry.

* * * * *